United States Patent [19]
McConnell et al.

[11] Patent Number: 5,475,972
[45] Date of Patent: Dec. 19, 1995

[54] TANK STRUCTURE FOR A HARVESTER AND METHOD OF ASSEMBLY

[75] Inventors: Kenneth C. McConnell, Ankeny; Mary A. Ruth, Des Moines, both of Iowa

[73] Assignee: Deere & Company, Moline, Ill.

[21] Appl. No.: 273,541

[22] Filed: Jun. 30, 1994

[51] Int. Cl.⁶ .................................................. A01F 12/60
[52] U.S. Cl. ................................................ 56/28; 460/119
[58] Field of Search ........................... 56/28, DIG. 9; 460/119, 901

[56] References Cited

U.S. PATENT DOCUMENTS

| | | | |
|---|---|---|---|
| 3,490,460 | 1/1970 | Baumeister et al. | 460/119 |
| 4,150,525 | 4/1979 | De Busscher et al. | 460/119 X |
| 4,715,515 | 12/1987 | Steilen | 222/143 |

FOREIGN PATENT DOCUMENTS 5103533  4/1993  Japan ..................................... 460/119

Primary Examiner—Terry Lee Melius

[57] ABSTRACT

An easily assembled and accessible tank structure for a cotton harvester wherein three tanks are located on the rear of the harvester frame behind the engine and partially over the rear steerable wheels. The frame includes a rear transverse beam which is removable during harvester assembly to provide an opening so that the tanks, which include supporting ledge structure, can be aligned with the frame and slid horizontally to an assembled position. Once the tank structure is slid into position, the rear transverse beam is reattached and cooperates with bracket structure to prevent fore-and-aft tank movement. The harvester is painted prior to assembly of the tanks onto the frame to avoid masking and overspray problems, and the rear tank locations provide good weight distribution.

22 Claims, 5 Drawing Sheets

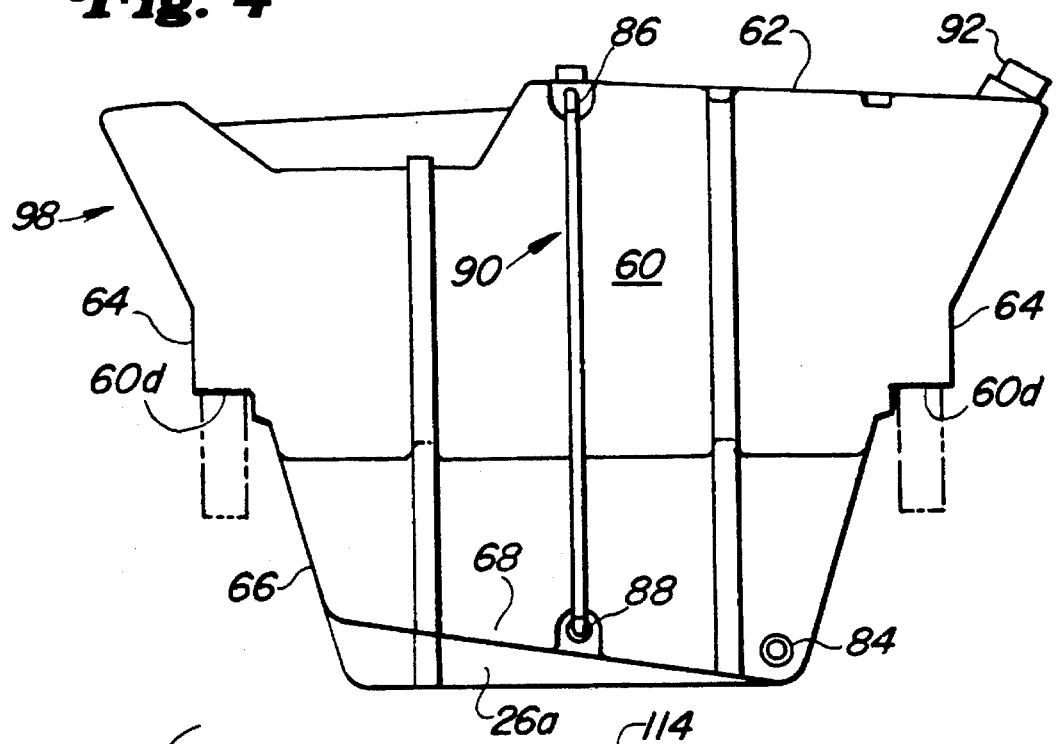
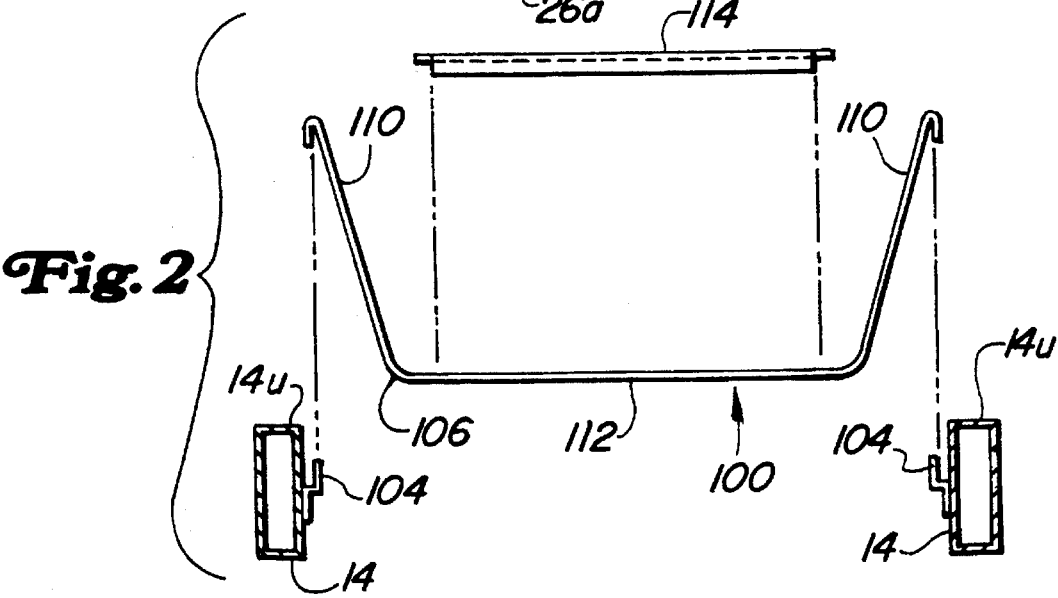

TANK STRUCTURE FOR A HARVESTER AND METHOD OF ASSEMBLY

BACKGROUND OF THE INVENTION

1) Field of the Invention

The present invention relates generally to crop harvesters and, more specifically, to tank structure for a cotton harvester or similar agricultural harvesting machine.

2) Related Art

Agricultural harvesters such as cotton pickers typically include a lubrication tank for supplying grease to bearing areas in the harvesting structure, as well as a water tank and a rear fuel tank. In harvesters such as the John Deere model 9965 Cotton Picker, the lubrication and water tanks are positioned next to the cab near the front of the machine. Such a tank location raises and shifts the center of gravity of the machine forwardly, limits access to the cab area, makes the tanks difficult to access :and is undesirable aesthetically. The locations of the tanks fail to optimize use of available space on the harvester. Installing the tanks during manufacture of the harvester is relatively time consuming. Further, the tanks have presented problems with respect to the painting of the harvester. Each tank has to be wrapped in a plastic bag for protection from overspray. Such wrapping is expensive and difficult, and after the harvester is painted the bag must be removed by hand. Small, loose tags of plastic are left after bag removal. Also, because of the attaching requirements of the tanks, any parts that are adjacent the tank must be pre-painted to assure adequate coverage.

Copending application of Kenneth C. McConnell, Ser. No. 08/200,789 filed Feb. 2, 1994 ("Tank Structure for a Harvester"), and of common ownership as the present application, discloses a tank arrangement wherein a plurality of tanks are mounted at the rear of a cotton harvester. The cotton harvester of the aforementioned application is of the type described in another copending and commonly assigned patent application Ser. No. 08/101,206 filed Aug. 3, 1993 ("Cotton Harvester").

BRIEF SUMMARY OF THE INVENTION

It is an object of the present invention to provide an improved tank structure for a harvester which overcomes most or all of the abovementioned problems. It is a further object to provide such an improved tank structure which is more easily assembled onto the harvester frame than at least most previously available structures.

It is a yet further object of the present invention to provide an improved tank structure for a harvester which minimizes painting problems and eliminates need for masking tanks when painting the harvester.

It is still another object to provide an improved tank structure for a harvester which provides better harvester weight distribution and which is relatively simple and inexpensive in construction and optimizes use of available space on the harvester frame. It is another object to provide such a structure which has an improved support and simplified assembly compared to most previously available structures.

It is a further object to provide an improved method for installing tank structure in a harvester. It is another object to provide such a method which simplifies and speeds mounting of the tanks on the harvester and reduces problems associated with painting the harvester.

In accordance with the above objects, tank structure on a machine such as a cotton harvester includes up to three tanks which are located on the rear of the harvester frame behind the engine and partially over the rear steerable wheels. The frame includes a rear transverse beam which is removable during harvester assembly to provide an opening so that the tanks can be simply slid horizontally to an assembled position. Once the tank structure is slid into position, the rear transverse beam is reattached. A simple tank saddle and a set of easy to install brackets cooperates with the transverse beam to prevent fore-and-aft and vertical tank movement. The harvester is painted prior to assembly of the tanks onto the frame to avoid masking and overspray problems, and the rear tank locations provide good access to the tanks.

Arranging the tanks at the rear of the harvester and rearwardly adjacent a transversely mounted engine permits larger tank capacity optimizes weight distribution so that front end loading is reduced. The area of the platform near the harvester cab is cleared. Assembly of the tanks onto the harvester frame is simplified over that of most previously available tank structures, and solid support of the tanks is provided while still maintaining simple and quick assembly and painting procedures. The tank structure with two or more tanks can be shipped from the tank supplier as a unit on a shipping frame, and the frame is simply aligned with the rear beams of the main frame so that the tanks can be slid into position without need for hoists or difficult tank maneuvering within the confines of the frame. The new tanks install after painting, so there is no problem with overspray. Masking is eliminated, and all adjacent parts are free to be painted prior to installation of the tanks.

These and other objects, features and advantages of the present invention will become apparent to one skilled in the art upon reading the following detailed description in view of the drawings.

BRIEF DESCRIPTION OF THE DRAWINGS

FIG. 2 is a view of the tank saddle utilized with the structure shown in FIG. 1.

FIG. 4 is a front view of the forward tank of the tank structure of FIG. 1.

DETAILED DESCRIPTION OF THE DRAWINGS

Figure 1:
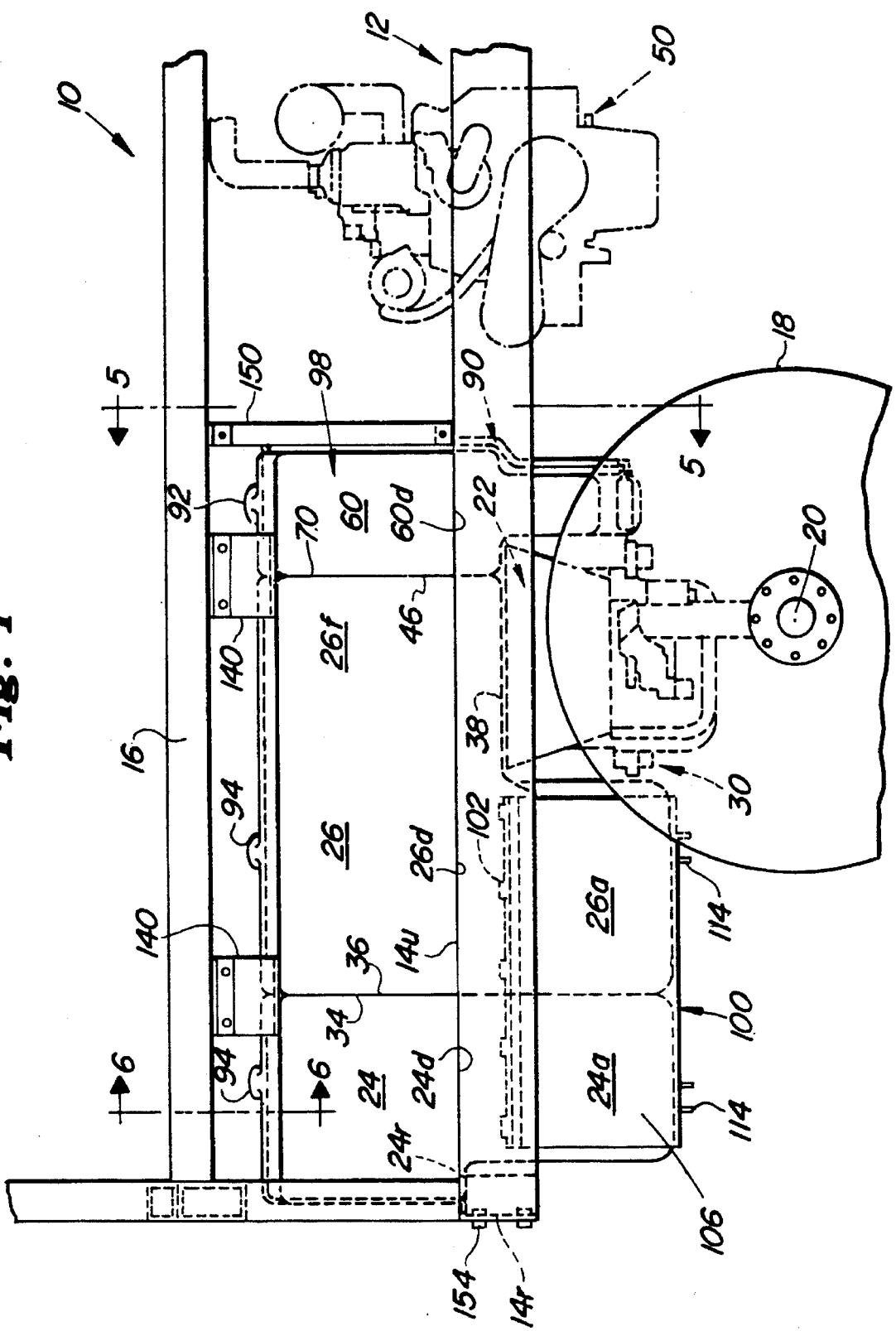
FIG. 1 is a side view of a portion of the rear of a cotton harvester frame supporting rear mounted tank structure.

Referring now to FIG. 1, therein is shown a agricultural harvester 10 such as a cotton picker having a fore-and-aft extending main frame 12 with fore-and-aft extending and transversely spaced lower main beams 14 and upper beams 16. The frame 12 is supported for forward movement over the ground by forward drive wheels (not shown) and rear steerable wheels 18 mounted on axles 20. The axles 20 are pivotally mounted on axle support structure 22 connected between and extending below the beams 14. Conventional row harvesting units (not shown) are supported at the forward end of the main frame 12 rearwardly and below forward cab structure.

The harvester 10 includes a rear tank 24, preferably a fuel tank, supported on the aft end of the main beams 14 and having a lower portion 24a extending below the bottom of the beams 14. A second tank 26, preferably a spindle fluid tank, is also supported on the frame 12 next to the tank 24 and rests on the axle support structure 22. The tank 26 includes a rear lower portion 26a depending below the beams 14 adjacent the tank portion 24a rearwardly of the axles 20 to define an accommodation space 30 for the support for the steerable wheels 18. As can be seen in FIG. 1, the tanks 24 and 26 have generally planar mating forward and rearward walls 34 and 36, respectively. The tank 26 has a forward portion 26f with an elevated bottom 38 extending horizontally over and resting on the axle support structure 22. The forward end of the tank 26 terminates in a transversely extending planar wall 46. Downwardly directed ledges 24d and 26d near the transition area at the upper end of the portions 24a and 26a rest on upper support surfaces 14u of the beams 14 and on a selectively removable rear transverse connecting beam 14r which extends between the beams 14.

A transversely mounted engine 50 is supported from the frame 12 forwardly adjacent the rear steerable wheels 18. A crop receptacle (not shown) is mounted on the frame 12 above the tanks 24 and 26 and the engine 50 for movement between field-working and dump positions. Mounting the engine 50 transversely frees up space along the frame 12 behind the engine, and a grease tank 60 is mounted in the space forwardly adjacent the tank 26 and behind the engine. The tank 60 shares a portion of the support structure 22 with the tank 26.

Figure 5:
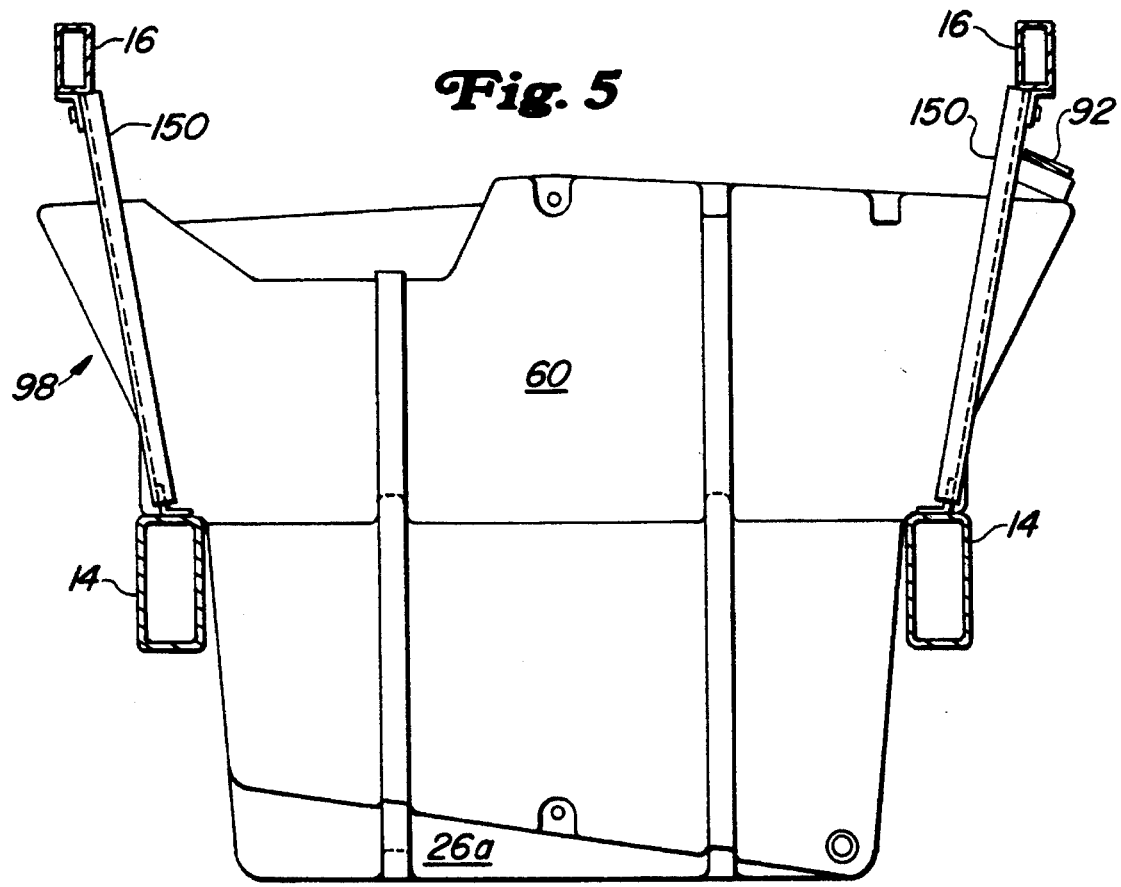
FIG. 5 is view taken generally along lines 5—5 of FIG. 1 and showing the forward tank brackets.

As seen in FIGS. 1, 4 and 5, the tank 60 tapers inwardly from a relatively wide top 62 to side ledge portions 64 which rest on the surfaces 14u of the beams 14. The tank 60 extends downwardly to a narrow lower portion 66 having an inclined bottom 68. A planar rear wall 70 abuts the forward wall 46 of the adjacent tank 26, and spaced, downwardly directed ledges 60d on the ledge portions 64 rest on the support surfaces 14u. The setback of the lower rear wall of the lower portion 66 defines the forward area of the accommodation space 30 for the axle support structure 22.

The tank 60 includes an outlet 84 near the lowermost portion of the inclined tank bottom 68 connected via conduit (not shown) to a lubricant pump. An upper outlet or vent hole 86 and a lower outlet 88 are provided in the front wall of the tank 60 closely adjacent the top and bottom 62 and 68. Grease level indicating structure 90 (FIG. 5) is connected to the outlets 86 and 88 to provide easy viewing of grease level from a location outside the frame 12. A filler cap 92 extends upwardly and outwardly from the left side of the top of the tank 60.

The profiles of the tanks 24 and 26 are similar to that shown in for the tank 60, and the supporting ledges 24d and 26d are aligned with the supporting ledges 60d. The tanks 24 and 26 include filler caps 94 and 96, respectively, which extend upwardly and outwardly from the left sides of the tops of the tanks. A tank assembly, indicated generally at 98, is defined by the plurality of similarly shaped tanks 24, 26 and 60 to form a compact, space-efficient fluid storage area which, when mounted on the harvester 10, has a low center of gravity and a rearward location on the frame 12 for improved harvester weight distribution.

Figure 3:
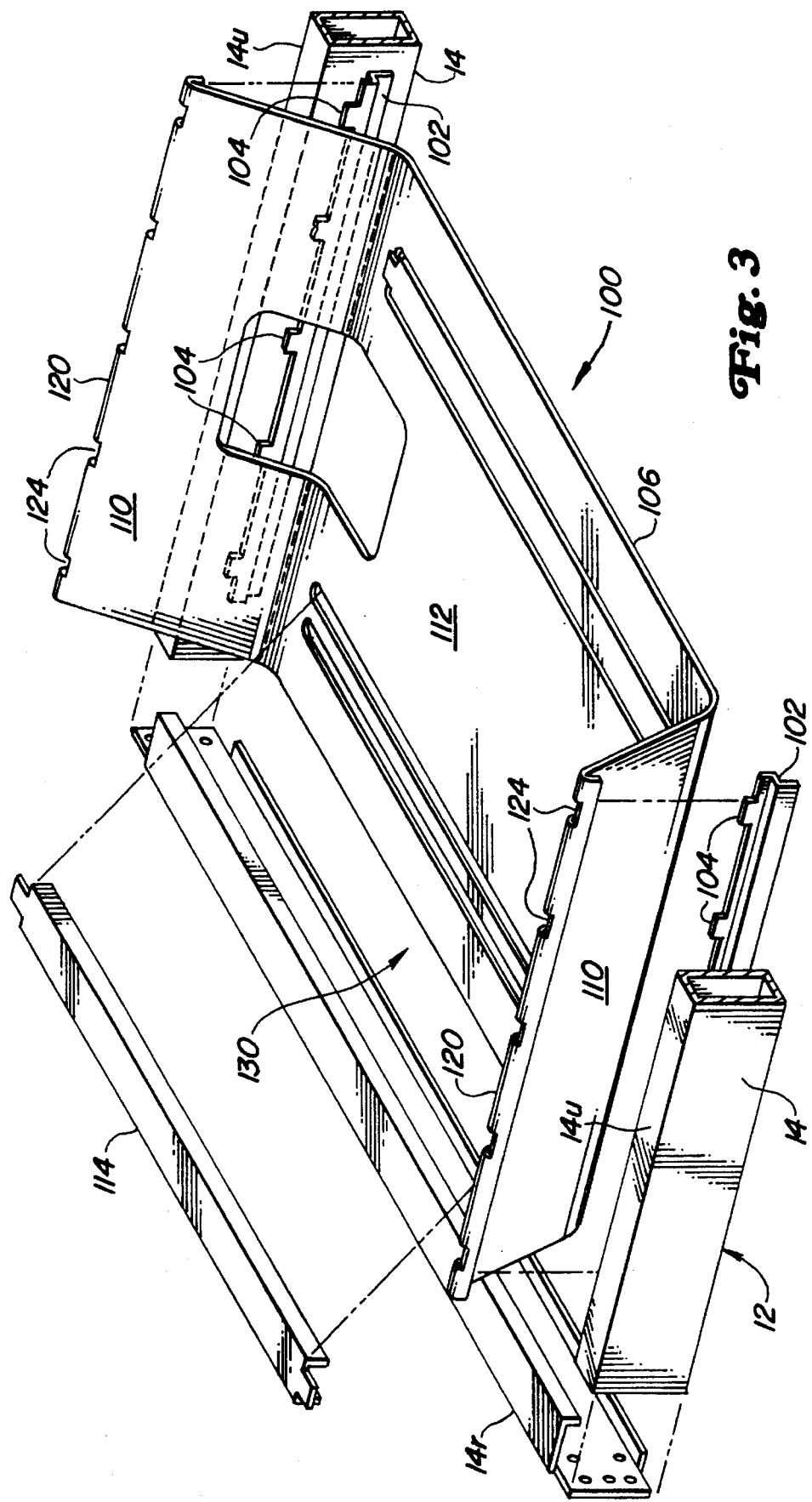
FIG. 3 is an exploded view of the tank saddle and the removable rear transverse beam.

Tank saddle structure 100 depends from the beams, 14 at the rear of the frame 12 forwardly adjacent the beam 14r to provide additional lower support for the tanks 24 and 26. A pair of brackets 102 are welded to the inside walls of the beams 14 and include upwardly projecting tabs 104 offset inwardly from the beams. A formed metal tank saddle 106 includes upwardly and outwardly diverging sidewalls 110 joined by a floor 112 having transverse sag-preventing stiffeners 114 (FIG. 3). The upper extremities of the sidewalls 110 are bent at 120, and elongated slots 124 are formed in the bend locations to receive the tabs 104. The saddle 106 hangs from the brackets 102 and spans the width of the rear opening (see 130 of FIG. 3) defined when the rear beam 14r is removed during mounting of the tank assembly 98. The saddle structure prevents the tanks 24 and 26, which preferably are fabricated from a plastic material, from sagging. The saddle 106 opens rearwardly towards the opening 130 so that a substantial unobstructed space between the rear portions of the beams 14 is provided when the rear beam 14r is removed prior to sliding the tanks 24, 26 and 60 forwardly into position on the support surfaces 14u of the beams.

Figure 6:
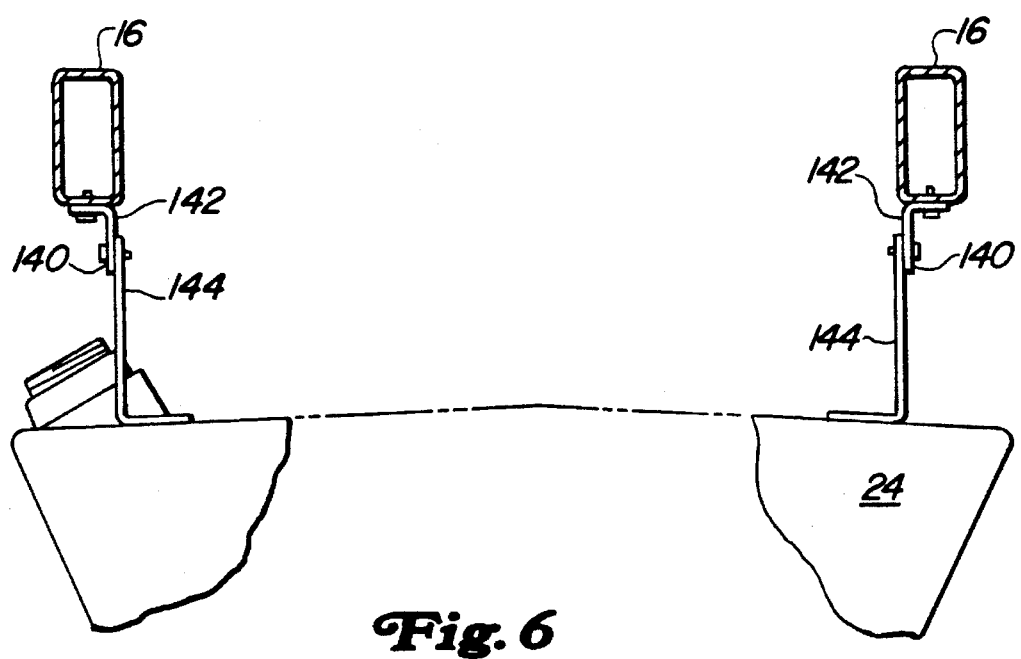
FIG. 6 is an enlarged view taken generally along lines 6—6 of FIG. 1 and showing the hold down brackets for the tank structure of FIG. 1.

Once the tanks are in their assembled position on the frame 12 as shown in FIG. 1, hold down brackets 140 (FIGS. 1 and 6) are connected to the upper beams 16 and bear against the tops of the tanks at the juncture locations between the tanks 24 and 26, and 26 and 60 to prevent vertical movement of the tanks and thereby retain the tabs 104 of the saddle brackets 102 in the saddle slots 124. The brackets 140 include angles 142 fixed to the bottom wall of the beams 16, and an elongated L-shaped retainer 144 having an upright leg is secured to the brackets 142 such that a horizontally disposed lower portion extends over the tops of the tanks. Forwardly adjacent the front wall of the tank 60, a pair of angles 150 (FIGS. 1 and 5) extend between and are connected to the beams 14 and 16 to secure the tank against fore-and-aft movement on the frame 12. The rear beam 14r is then attached to the aft ends of the beams 14 to close the opening 130 and thus secure the tanks 24 and 26 between the axle support structure 22 and the rear beam. A rear portion 24r of the tank 24 generally rests on the upper surface of the beam 14r. The beam 14r is releasibly connected to the beams 12 by bolts 154 or other suitable connecting means.

Figure 7:
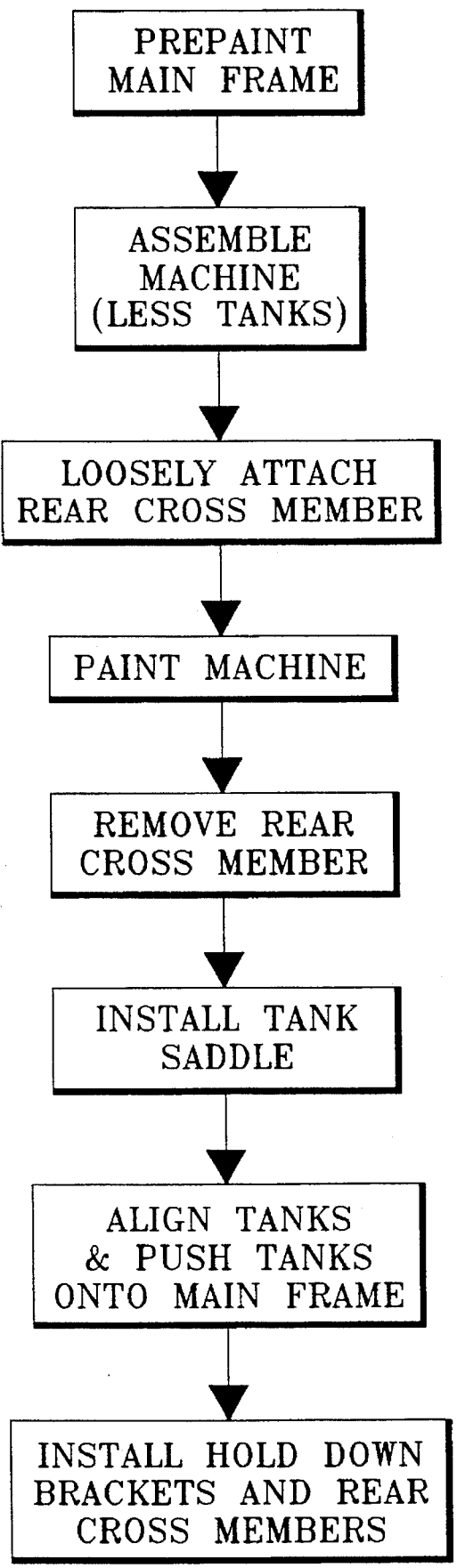
FIG. 7 is a chart illustrating generally the steps of the assembly and painting process for the structure of FIG. 1.

The harvester frame is first assembled and prepainted (FIG. 7). Thereafter, a substantial portion of the remainder of the machine, less the tank assembly 98, is assembled with the rear beam 14r connected loosely to the rear of the frame 12 by the bolts 154. The machine is then painted.

After painting of the machine, the rear beam 14r is removed to define the tank-receiving opening 130 which opens in the forward direction at the rear of the frame. The tank saddle 106 is installed. The tank assembly 98, which preferably is received from a tank supplier in a supporting rack structure, is aligned with the opening 130 such that the supporting tank ledge structures 24d, 26d and 60d are aligned with each other and with the corresponding support surfaces 14u. The tanks 24, 26 and 60 are pushed generally as a unit horizontally onto the frame 12. The forward tank 60 is rotated upwardly to allow it to pass over the axle support structure 22. All the tanks are pushed fully into the machine to the position shown in FIG. 1, and the brackets 140 and the front support angles 150 are installed.

Having described the preferred embodiment, it will become apparent that various modifications can be made without departing from the scope of the invention as defined in the accompanying claims.

We claim:

1. In a cotton harvester having a main fore-and-aft extending main frame adapted for supporting a forward cab and row harvesting units forwardly of and below the cab, harvester tank structure for containing liquids, the main frame including tank support structure defining spaced upwardly directed support surfaces, a movable frame portion releasibly connected to the main frame, the frame portion when released providing a tank receiving access area opening from the support structure, and wherein the tank receiving access area facilitates generally horizontal movement of the tank structure into a supported position on the support surfaces.

2. The invention as set forth in claim 1 wherein the tank receiving access area is at the aft end of the frame and opens rearwardly when the frame portion is released such that the tank structure can be moved into the supported position on the support surfaces substantially by forward sliding movement.

3. The invention as set forth in claim 2 wherein the movable frame portion defines an aft main frame connecting portion.

4. The invention as set forth in claim 1 wherein the main frame includes transversely spaced fore-and-aft extending beams having upper faces defining the tank support surfaces, and wherein the movable frame portion comprises a rear frame member connecting the aft ends of the beams.

5. The invention as set forth in claim 1 wherein the tank structure includes downwardly directed ledge structure which, prior to sliding the tank structure into position, is aligned with the tank support surfaces to facilitate movement of the tank structure into a resting position on the tank support surfaces.

6. The invention as set forth in claim 5 wherein the tank support surfaces are substantially horizontal so that the tank structure can be slid substantially horizontally into position on the support surfaces.

7. The invention as set forth in claim 5 wherein the tank structure includes at least two individual tanks, and the individual tanks each include ledges defining the ledge structure, the ledge structure aligned in the vertical direction with the support surfaces prior to sliding the tank into position.

8. The invention as set forth in claim 5 wherein the main frame comprises transversely spaced fore-and-aft extending main beams and the selectively removable frame section comprises a transverse beam extending substantially horizontally between the main beams.

9. The invention as set forth in claim 8 wherein the transverse beam is releasibly connected to the aft ends of the main beams and the tank structure includes a lower portion depending from the support surfaces and the transverse beam.

10. The invention as set forth in claim 9 further comprising bracket structure connected to the main frame and contacting the tanks to prevent substantial vertical movement of the tanks relative to the support surfaces.

11. The invention as set forth in claim 1 further comprising a tank saddle supported from the main frame and extending under the tank structure when the tank structure is in the supported position, the tank saddle opening in the direction of the access area out of interfering relationship with the tank structure so that the tank structure may be moved substantially horizontally into the supported position over the saddle.

12. A method for fabricating a machine such as a cotton harvester having a fore-and-aft extending main frame including transversely spaced beams supported for movement over the ground by wheel structure, the wheel structure including a rear wheel assembly located near the aft end of the main frame, an engine supported on the main frame adjacent the rear wheel assembly, and tank structure for containing at least one fluid, the method for fabricating including:

providing an upwardly directed support surface on a portion of the main frame;

providing a tank receiving opening at one portion of the frame;

moving the tank structure through the tank receiving opening and onto the support surface, the step of moving the tank including sliding the tank substantially horizontally: and closing the tank receiving opening after the step of moving the tank structure.

13. The method as set forth in claim 12 wherein the step of closing the tank receiving opening includes connecting a transversely extending frame portion between the beams.

14. The method as set forth in claim 13 wherein the step of providing a tank receiving opening includes disconnecting the transversely extending frame portion.

15. The method as set forth in claim 12 further comprising the step of painting the main frame prior to the step of moving the tank structure.

16. The method as set forth in claim 14 further comprising the step of painting the main frame prior to the steps of providing a tank receiving opening and moving the tank structure.

17. The method as set forth in claim 12 wherein the step of moving the tank structure includes sliding the tank structure horizontally on the support surface to an assembled support position without substantial vertical movement of the tank structure.

18. The method as set forth in claim 17 further comprising the steps of providing a generally horizontal ledge portion on the tank structure, and prior to the step of sliding, supporting the tank structure outwardly adjacent the frame with the horizontal ledge portion aligned with the support surface.

19. The method as set forth in claim 12 wherein the step of moving the tank structure includes moving at least two adjacent tanks to a support location rearwardly of the engine, and further including the step of supporting the tanks adjacent each other and the tank receiving opening prior to the step of moving, and wherein the step of moving the tank further includes moving the tanks generally as a unit onto the support surface.

20. The method as set forth in claim 17 wherein the step of providing a tank receiving opening includes removing a frame member from the aft end of the frame and the step of moving the tank structure includes moving the tank onto the aft end of the frame.

21. The method as set forth in claim 20 wherein the step of removing the frame member from the aft end of the frame includes opening the aft end of the frame between the transverse beams, and the step of moving the tank includes moving the tanks forwardly through the open aft end of the frame.

22. The invention as set forth in claim 12 wherein the step of moving the tank structure includes moving at least two tanks, and further comprising the step of supporting the two tanks and a third tank between the engine and the aft end of the frame.

* * * * *